US012657096B2

(12) United States Patent
Koparde et al.

(10) Patent No.: US 12,657,096 B2
(45) Date of Patent: Jun. 16, 2026

(54) PROGRAMMING FAILURE HANDLING DURING DATA FOLDING

(71) Applicant: Micron Technology, Inc., Boise, ID (US)

(72) Inventors: Jotiba Koparde, Bangalore (IN); Nicola Colella, Capodrise (IT); Sridhar Prudviraj Gunda, Bangalore (IN)

(73) Assignee: Micron Technology, Inc., Boise, ID (US)

( * ) Notice: Subject to any disclaimer, the term of this patent is extended or adjusted under 35 U.S.C. 154(b) by 82 days.

(21) Appl. No.: 18/434,461

(22) Filed: Feb. 6, 2024

(65) Prior Publication Data

US 2024/0281346 A1    Aug. 22, 2024

Related U.S. Application Data

(60) Provisional application No. 63/486,367, filed on Feb. 22, 2023.

(51) Int. Cl.
*G06F 11/00*        (2006.01)
*G06F 11/07*        (2006.01)
*G06F 11/10*        (2006.01)
*G06F 11/16*        (2006.01)

(52) U.S. Cl.
CPC ...... *G06F 11/1658* (2013.01); *G06F 11/0787* (2013.01); *G06F 11/1016* (2013.01)

(58) Field of Classification Search
CPC ............. G06F 11/0772; G06F 11/0787; G06F 11/1016; G06F 11/1658; G06F 3/061; G06F 3/0619; G06F 3/0647; G06F 3/0679
See application file for complete search history.

(56) References Cited

U.S. PATENT DOCUMENTS

2016/0019111 A1 * 1/2016 Kochar ............... G06F 12/0246
                                                                714/6.12
2016/0092325 A1 * 3/2016 Bar ..................... G06F 11/0775
                                                                714/6.1

* cited by examiner

*Primary Examiner* — Marc Duncan
(74) *Attorney, Agent, or Firm* — Holland & Hart LLP

(57)        ABSTRACT

Methods, systems, and devices for programming failure handling during data folding are described. A memory system may support a non-blocking exception handling process for handling program failures that occur during folding. For example, if a program failure occurs at a given page, the memory system may mark the failed page as storing uncorrectable data (e.g., associated with an uncorrectable error correction code (UECC) error) rather than as being associated with the program failure. Based on the marking, the memory system may continue the folding operation, allowing the data to be moved to another page of a physical destination block. After the folding operation is complete, the memory system may replace a failed physical destination block that includes the failed page with a spare block and retire the failed physical destination block.

20 Claims, 6 Drawing Sheets

Initiate a transfer operation to transfer data stored at a first set of one or more blocks of a memory system to a second set of one or more blocks of the memory system — 605

Mark one or more pages of a subset of one or more blocks of the second set of one or more blocks as including uncorrectable data based at least in part on a program failure during the transfer operation that is associated with transferring a subset of the data to the one or more pages — 610

Transfer, as part of the transfer operation, the subset of data to one or more additional pages of the second set of one or more blocks based at least in part on marking the one or more pages — 615

600

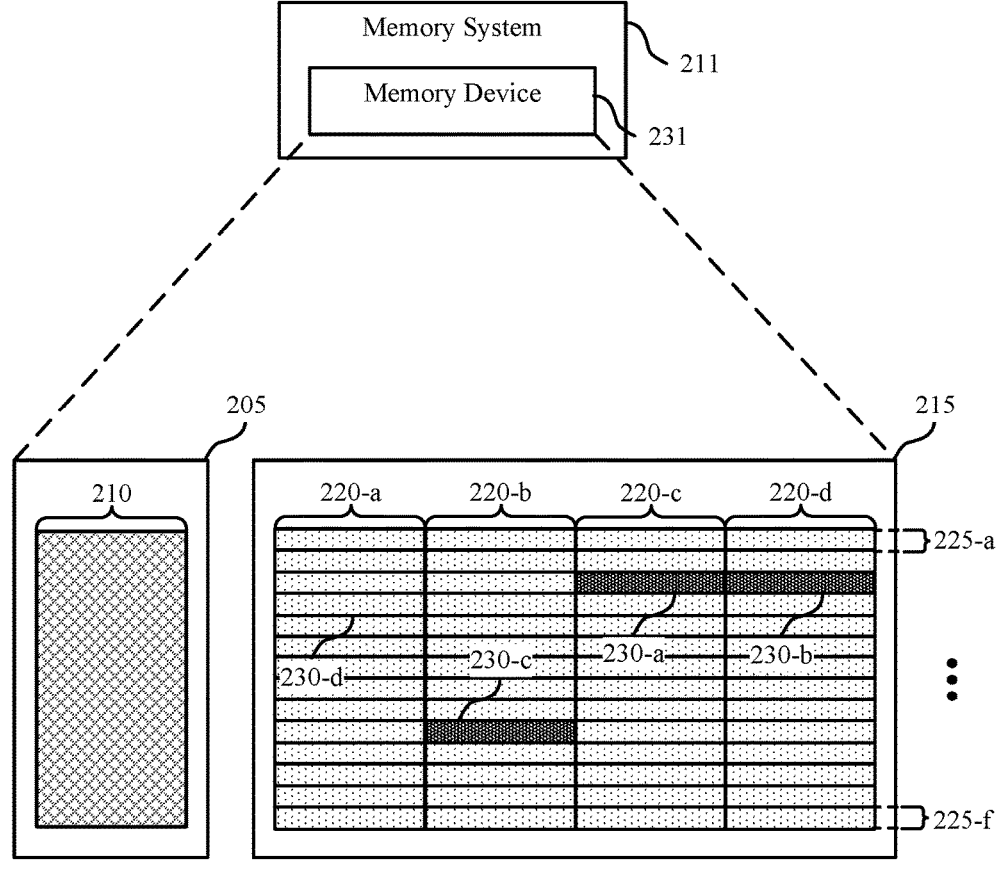
FIG. 2

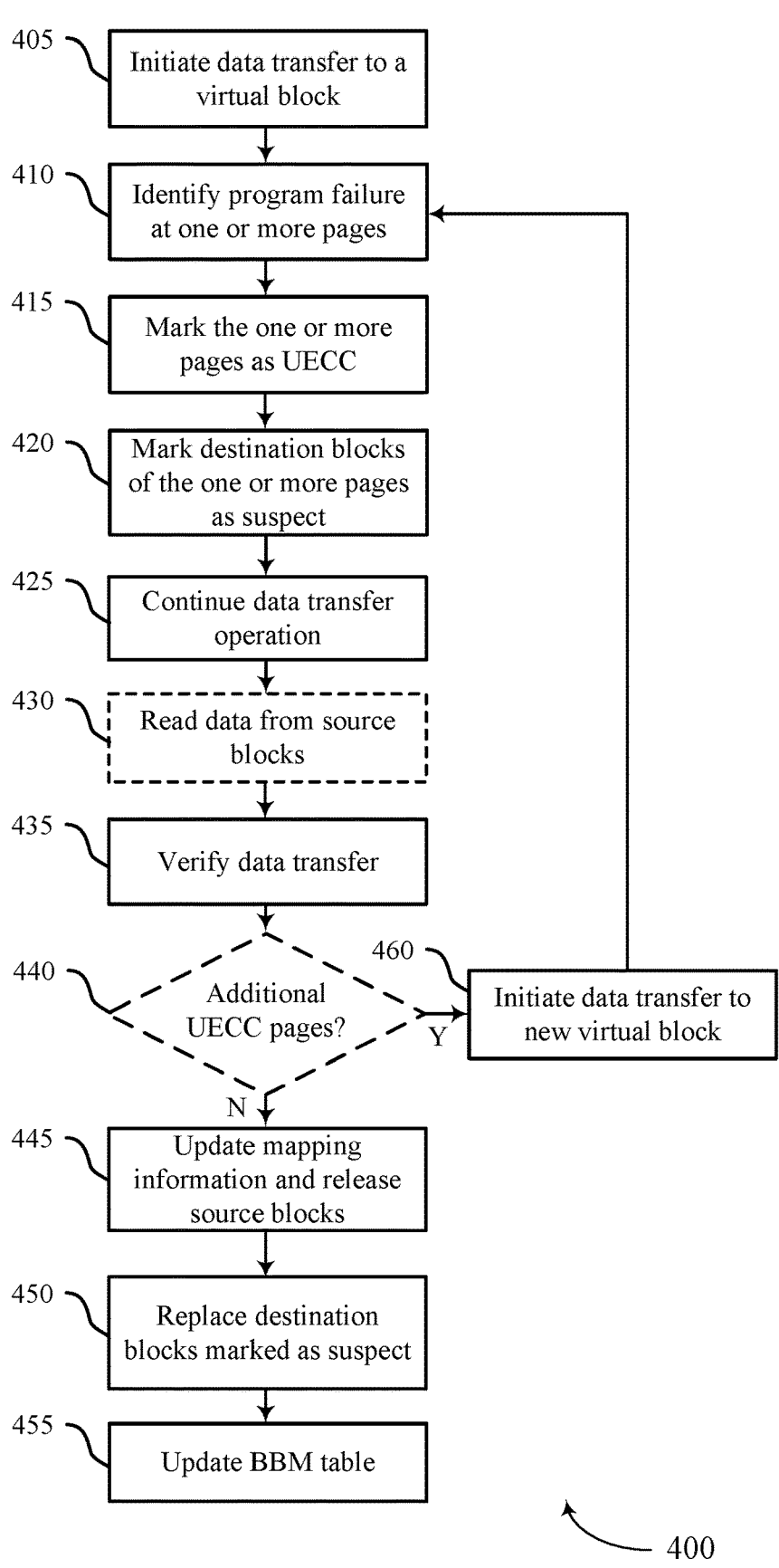

405 — Initiate data transfer to a virtual block

410 — Identify program failure at one or more pages

415 — Mark the one or more pages as UECC

420 — Mark destination blocks of the one or more pages as suspect

425 — Continue data transfer operation

430 — Read data from source blocks

435 — Verify data transfer

440 — Additional UECC pages?

460 — Initiate data transfer to new virtual block

445 — Update mapping information and release source blocks

450 — Replace destination blocks marked as suspect

455 — Update BBM table

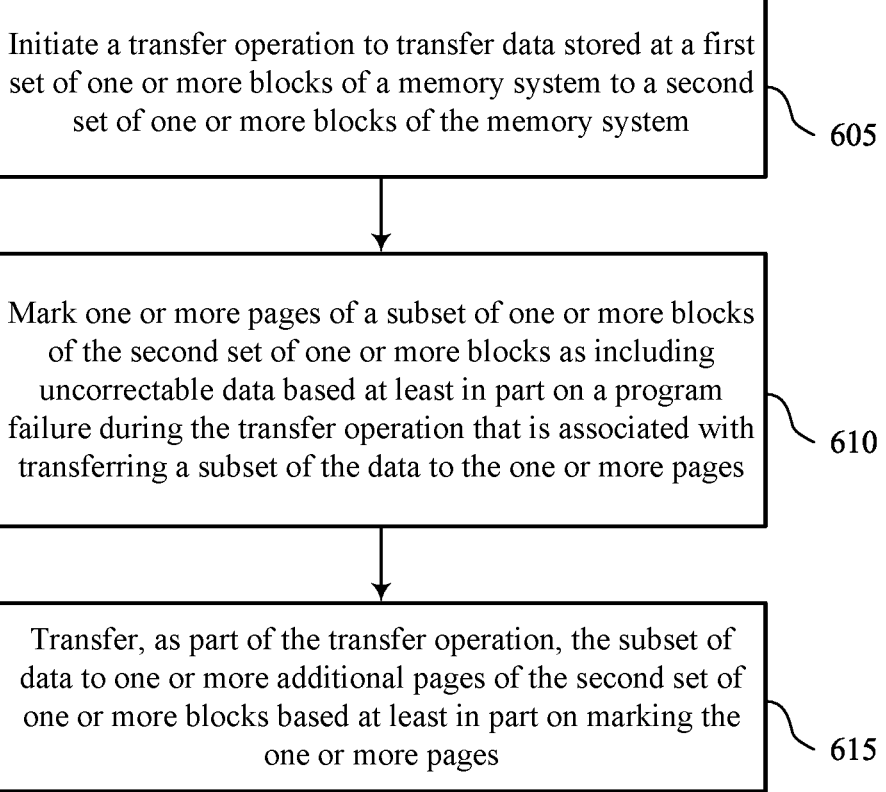

Initiate a transfer operation to transfer data stored at a first set of one or more blocks of a memory system to a second set of one or more blocks of the memory system

605

Mark one or more pages of a subset of one or more blocks of the second set of one or more blocks as including uncorrectable data based at least in part on a program failure during the transfer operation that is associated with transferring a subset of the data to the one or more pages

610

Transfer, as part of the transfer operation, the subset of data to one or more additional pages of the second set of one or more blocks based at least in part on marking the one or more pages

PROGRAMMING FAILURE HANDLING DURING DATA FOLDING

CROSS REFERENCE

The present Application for patent claims priority to and the benefit of U.S. Provisional Application No. 63/486,367 by Koparde et al., entitled "PROGRAMMING FAILURE HANDLING DURING DATA FOLDING," filed Feb. 22, 2023, assigned to the assignee hereof, and is expressly incorporated by reference in its entirety herein.

TECHNICAL FIELD

The following relates to one or more systems for memory, including programming failure handling during data folding.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

BRIEF DESCRIPTION OF THE DRAWINGS

FIG. 2 illustrates an example of a system that supports programming failure handling during data folding in accordance with examples as disclosed herein.

FIG. 4 illustrates an example of a process flow that supports programming failure handling during data folding in accordance with examples as disclosed herein.

FIG. 6 illustrates a flowchart showing a method or methods that support programming failure handling during data folding in accordance with examples as disclosed herein.

DETAILED DESCRIPTION

Folding may be a process of moving (e.g., transferring) data from source blocks (e.g., single-level cell (SLC) blocks, SLC virtual blocks, among other blocks) of a memory system to destination blocks (e.g., multi-level cell (MLC), tri-level cell (TLC), or quad-level cell (QLC) blocks or virtual blocks) of the memory system, for example, based on garbage collection thresholds of the memory system, among other conditions that may trigger folding (e.g., a quantity of available SLC, MLC, or TLC blocks, an idle time of a host system, and so on). In some cases, if a program failure occurs during a folding operation, the memory system may mark the program failure as having occurred within the physical destination block (e.g., mark the destination block for garbage collection) and replace the physical destination block with a spare block. However, this process for program failure handling may cause excess delay and increase write amplification associated with the folding operation, leading to reduced host performance and device life. For example, a physical block replacement may occur before the memory system proceeds with the rest of the folding operation, thereby increasing the overall latency of the folding operation.

A non-blocking exception handling process for handling program failures that occur during folding is described herein. For example, if a program failure occurs in association with writing data to one or more pages of a physical destination block, the memory system may mark the one or more pages as including (e.g., storing, being associated with) uncorrectable data, such as being associated with uncorrectable error correction code (UECC) errors) rather than, for example, marking the physical destination block for garbage collection. As such, the system may continue the folding operation (e.g., move the data to a subsequent page of the failed physical destination block), allowing the data to be moved to a destination block (e.g., the physical destination block, another physical destination block) after a program failure without replacement of the failed physical destination block. After the folding operation is complete, the memory system may replace the failed physical destination block, for example, due to a higher likelihood of additional program failures occurring within a block where a program failure has occurred previously. Without diverting to a replacement operation, and without discarding entire physical blocks during a program failure, the memory system will reduce both the folding latency and write amplification, among other benefits.

Figure 1:
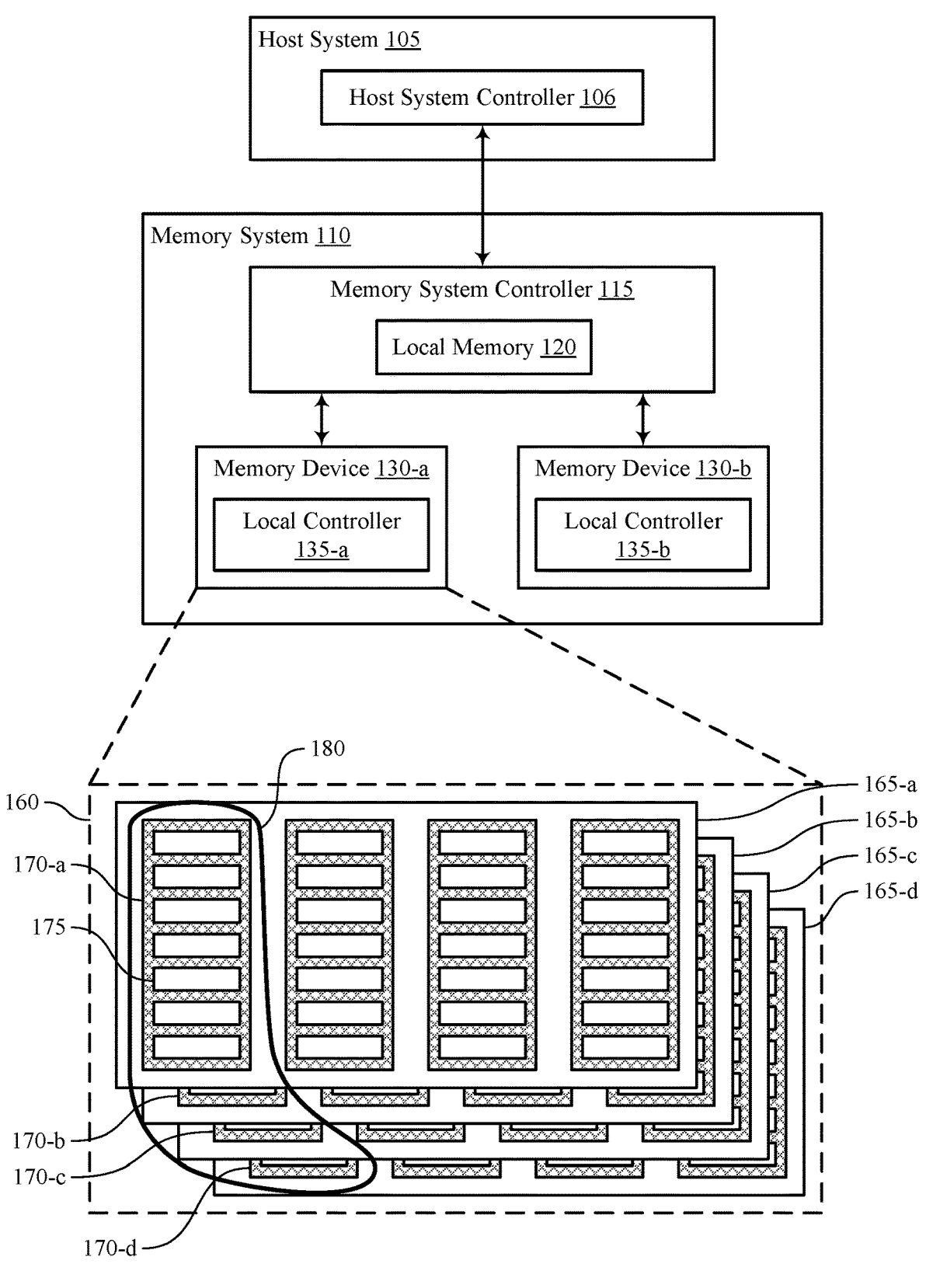
FIG. 1 illustrates an example of a system that supports programming failure handling during data folding in accordance with examples as disclosed herein.

Features of the disclosure are initially described in the context of systems, devices, and circuits with reference to FIG. 1. Features of the disclosure are described in the context of systems and a process flow with reference to FIGS. 2 through 4. These and other features of the disclosure are further illustrated by and described in the context of an apparatus diagram and flowchart that relate to programming failure handling during data folding with reference to FIGS. 5 and 6.

FIG. 1 illustrates an example of a system 100 that supports programming failure handling during data folding in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IOT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hardcoded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EE-PROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as SLCs. Additionally, or alternatively, a NAND memory device 130 may include memory cells configured to each store multiple bits of information, which may be referred to as MLCs if configured to each store two bits of information, as TLCs if configured to each store three bits of information, as QLCs if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block 180 may include blocks 170 from different dies 160. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line). As described herein, multiple blocks 170 across different dies 160, different memory device 130, different planes (e.g., 170-a, 170-b, 170-c, and 170-d) of dies 160, or a combination thereof, may form a group of blocks 170, for example, within or as a virtual block 180.

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The system 100 may include any quantity of non-transitory computer readable media that support programming failure handling during data folding. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

The memory system 110 may support transfer operations (e.g., folding operations) in which the memory system 110 may transfer data from one or more source blocks (e.g., a source virtual block 180, one or more source blocks 170) to one or more destination blocks (e.g., a destination virtual block 180, one or more destination blocks 170). In some instances, during a folding operation, the memory system 110 may identify a program failure at one or more physical destination blocks. For example, the program failure may occur as part of transferring data from one or more pages 175 of one or more physical source blocks to one or more pages 175 of the one or more physical destination blocks.

The memory system may mark the failed one or more pages as storing uncorrectable data (e.g., pages with UECC errors). In some examples, the memory system may mark the one or more physical destination blocks, a virtual block 180 of the one or more failed physical destination blocks, or any combination thereof, as a suspect block (e.g., as being associated with the program failure). Because the one or more pages 175 are marked as uncorrectable data (e.g., instead of being marked as being associated with the program failure, such as being marked for garbage collection), the memory system 110 may proceed with the folding operation without replacing the one or more failed destination blocks before completion of the folding operation. For example, the memory system 110 may continue the transfer of the data, including transferring the data associated with the program failure to one or more other pages 175 of the one or more destination blocks (e.g., the adjacent page 175 or another subsequent page 175), and transferring at least some remaining data from the one or more source blocks to the one or more destination blocks (e.g., including the one or more failed destination blocks). After the folding operation is complete, the memory system 110 may replace the one or more failed physical destination blocks with one or more spare blocks (e.g., as part of a refresh operation). For example, the data stored at the one or more failed destination blocks, including data impacted by the program failure, may be copied (e.g., blind copied) to the one or more spare blocks, and the one or more failed destination blocks may be retired.

FIG. 2 illustrates an example of a system 200 that supports programming failure handling during data folding in accordance with examples as disclosed herein. The system 200 may be an example of a system 100 as described with reference to FIG. 1, or aspects thereof. The system 200 may include a memory system 211 configured to transfer data from at least one source block 210 of a virtual block 205 to at least one destination block 220 of a virtual block 215. The system 200 may implement aspects of the system 100 as described with reference to FIG. 1. For example, virtual blocks 205 and 215 may be examples of a virtual block 180, and blocks 210 and 220-a, 220-b, 220-c, and 220-d may be examples of blocks 170-a, 170-b, 170-c, and 170-d, respectively. Additionally, pages 230 of the blocks may be examples of pages 175.

The system 200 may include a memory system 211, which may include at least one memory device 231 to store data transferred between the memory system 211 and a host system. For example, the memory device 231 may include one or more virtual blocks 205 for one or more source blocks 210, each with one or more pages. Additionally, the memory device 231 may include one or more virtual blocks 215 for one or more blocks 220 (e.g., 220-a, 220-b, 220-c, and 220-d), and each of the blocks 220 may have one or more pages 230. In some examples, the virtual blocks 205 and 215 may span multiple memory devices 231 (e.g., multiple dies 160 of the memory system 211). Each block 220 may be associated with a respective plane (e.g., a plane 165) of the one or more memory devices 231. Within the virtual block 215, the same page 230 across each block 220 may share (e.g., be coupled with) a common word line 225. For example, the first page of each block 220 may be coupled with a common word line 225-a (e.g., WL0), the last page of each block 220 may be coupled with a common word line 225-f (e.g., WLN−1), and so on. In some examples, the pages 230 of a common word line 225 may be referred to as a pageline. In some examples, the common word line 225 may be a virtual word line used to logically group a pageline of pages 230.

The memory system 211 may perform a folding operation (e.g., a transfer operation) on the virtual blocks 205 and 215 to release one or more blocks. For example, the folding operation may transfer data from each of the source blocks 210 (e.g., SLC blocks, or multiple-level memory cell blocks, such as MLC, TLC, or QLC blocks) of the virtual block 205 to the destination blocks 220 (e.g., multiple-level memory cell blocks, such as MLC, TLC, or QLC blocks) of the virtual block 215. Accordingly, after the transfer is complete, the memory system 211 may release the source blocks 210 into a free pool for further use (e.g., erase the source blocks 210 for storage of other data). In some cases, program failures may occur during a given folding operation, and the memory system 211 may replace the destination block 220 associated with the program failure (e.g., within which the program failure occurs) before proceeding with the folding operation. However, diverting (e.g., pausing) the folding operation to perform a replacement (e.g., refresh) operation on the failed destination block 220 may introduce excess latency to the folding operation and increase write amplification, which may reduce an operable lifetime of the memory system 211. For example, to execute the replacement during the folding operation, a copy of the data may be written to another block before being written to the replacement block, for example, due to firmware activity. Such data copying may increase the quantity of times that given data is written, thereby increasing write amplification.

The programming failure handling as disclosed herein may enable the memory system 211 to perform a non-blocking programming failure handling while reducing interruption to the folding operation. For example, if a program failure occurs, the memory system 211 may mark a failed block associated with the program failure (e.g., a block 220, the virtual block 215) as a suspect block, fold the data to a subsequent page 230 of the virtual block 215, and proceed to fold remaining data to the virtual block 215. Accordingly, latency associated with the folding operation may be reduced latency as the folding operation be completed without (e.g., before) replacing a block 220 associated with the program failure.

For example, the memory system 211 may transfer data stored at a set of one or more source blocks 210 of the memory system 211 (e.g., the virtual block 205) to a set of one or more destination blocks 220 of the memory system 211 (e.g., the virtual block 215). During the transfer of data, the memory system 211 may identify a program failure for a respective destination block 220 (e.g., destination block 220-c, as illustrated in the example of FIG. 2). The memory system 211 may mark a failed page 230 (e.g., 230-a) of the failed destination block 220 as including uncorrectable data (e.g., as being associated with a UECC error) based on where the program failure occurred. For example, the memory system 211 may store an indication that the failed page 230-a stores uncorrectable data. In some examples, although the failed page 230 may not include UECC, as the data failed to be written to the page 230, the memory system 211 may mark the failed page 230 as including UECC rather than marking the data for garbage collection (e.g., marking the failed page 230 or the block 220 including the failed page 230 as being associated with the program failure).

In addition to marking the failed page 230, the memory system 211 may mark the failed destination block 220 (e.g., block 220-c) as a suspect (e.g., SUSPECT) block based on the location of the failed page 230. For example, the memory system 211 may store an indication that the failed destination block 220 is associated with the program failure. If multiple destination blocks 220 of the virtual block 215 experience (e.g., are associated with) a program failure, the memory system 211 may mark each of the failed destination blocks 220 as suspect blocks (e.g., and the corresponding pages 230 as including uncorrectable data).

In some cases, the memory system 211 may mark the virtual block 215 of the failed destination block 220 as a suspect virtual block. For example, the memory system 211 may store an indication that the virtual block is associated with the program failure based on the virtual block 215 including one or more pages 230 (e.g., pages 230-a, 230-b, and 230-c) marked as UECC. In some examples, based on the virtual block 215 being marked as a suspect virtual block, the memory system 211 may add an identifier of the virtual block 215 (e.g., an identification (ID) value, or the like) to a list (e.g., a read scrub list) of virtual blocks. For example, the list may include identifiers for any virtual block marked as including UECC (among other virtual blocks). The list may be a list of virtual blocks for which the memory system 211 is to perform bad block management. For example, the list may indicate to the memory system 211 which virtual blocks include one or more blocks that have failed and should be replaced with one or more spare blocks. In some examples, the memory system 211 may indicate that the virtual block 215 is added to the list due to a program failure. Thus, the list may facilitate the memory system 211 in replacing (e.g., immediately refreshing) each of the destination blocks 220 of the suspect virtual block 215 that are marked as suspect (e.g., blocks 220-b, 220-c, and 220-d) after the folding operation is complete. For example, the refresh may occur during a next period of idle time, or in response to a read scrub command for the virtual block 215, after all of the data is transferred to the virtual block 215.

After marking the failed page 230-a, the failed destination block 220-c, the virtual block 215, or any combination thereof, the memory system 211 may continue to transfer data. In some cases, if a program failure has occurred, the memory system may re-attempt to transfer the same portion of data again. For example, after the portion of data fails to be transferred to the page 230-a (e.g., a failed page), and the page 230-a is marked for UECC, the memory system may attempt to transfer the same data to another page (e.g., an adjacent page 230-b, or another subsequent page 230 of the virtual block 215). If another program failure occurs, such as at page 230-b, the memory system 211 may attempt yet another transfer to another page 230 of the virtual block 215. If another program failure does not occur, such as at page 230-d, the data may be successfully transferred to the page (e.g., of another destination block of the virtual block 215). In some cases, the memory system may transfer the remaining data to other pages 230 of the suspect block 220-c or other destination blocks 220 of the virtual block 215. For example, after the failed portion of data is transferred again, and successfully stored at a destination block 220-a, the memory system may continue with the transfer operation until another program failure occurs (e.g., at page 230-c), or until all of the data is transferred.

In some cases, the memory system 211 may receive a command (e.g., a read command) to access a portion of the data transferred to the destination blocks 220 of the virtual block 215. If the memory system receives the read command before the data transfer is complete (e.g., and before the one or more suspect blocks 220 are refreshed), the memory system 211 may read the portion of the data from the source blocks 210 rather than the destination blocks 220 (e.g., and the included suspect blocks 220-b, 220-c, and 220-d). For example, L2P mapping information may be updated to map the logical data to the pages 230 of the destination blocks 220 after the data transfer is complete. As such, the L2P mapping information may still map the logical data to the pages of the source blocks 210. Accordingly, if a read command is received within this time frame, the memory system 211 may read the data from the source blocks 210.

After the data is transferred, the memory system 211 may initiate a verification operation (e.g., a read verify) to verify the transfer of the data to the virtual block 215. For example, the memory system 211 may verify each of the suspect blocks 220-b, 220-c, and 220-d of the virtual block 215, checking each unmarked page 230 (e.g., 230-d) of the suspect blocks 220-*b*, 220-*c*, and 220-*d* for uncorrectable data (e.g., UECCs). In some examples, the memory system 211 may explicitly exclude (e.g., skip) any pages 230 already marked for UECC (e.g., pages 230-*a*, 230-*b*, and 230-*c*) as part of the verification operation. If the memory system 211 does not identify additional pages 230 with UECC, the memory system 211 may update mapping information (e.g., an L2P table) associated with the virtual block 215. For example, the memory system 211 may update the mapping of logical addresses associated with the transferred data to the physical addresses associated with the destination blocks 220 of the virtual block 215 (e.g., the physical addresses of the pages 230 to which the data was successfully transferred). After (e.g., in response to) the mapping information is updated, the memory system 211 may release the source blocks 210 to a free pool of blocks. For example, the memory system 211 may erase the source blocks 210.

Alternatively, if the memory system 211 identifies one or more additional pages 230 with UECC during the verification operation, the memory system 211 may initiate a new transfer operation (e.g., folding operation) to transfer the data. For example, the new transfer operation may transfer the data stored at the source blocks 210 to one or more destination blocks of another virtual block, different than the virtual block 215. In this case, the data may be maintained at the source blocks 210 until the new transfer operation, and any associated refresh operations, verification operations, or the like, are complete. For example, the memory system 211 may apply one or more of the processes described with reference to virtual block 215 to the new virtual block, and the respective new destination blocks.

After the transfer operation is complete and verified, the memory system 211 may initiate a media management operation (e.g., a refresh operation, a garbage collection operation, a replacement operation) to replace each of the suspect blocks 220 (e.g., the blocks 220-*b*, 220-*c*, and 220-*d*) of the virtual block 215 with a respective spare block. In some cases, the refresh operation may be initiated according to the read scrub list, and each virtual block indicated therein. To perform the media management operation for each suspect block 220, the memory system 211 may transfer (e.g., copy) the data stored at a given suspect block to a respective spare block. For example, the transferred data may include any uncorrectable data as well as any additional data that was previously transferred from the source block 210 to the given suspect block 220. After the data is transferred to the spare block, the memory system 211 may link each of the spare blocks (e.g., with the transferred data) to the virtual block 215. That is, the spare blocks may logically replace the suspect blocks 220 within the virtual block 215. In this way, block replacement may occur for a failed block 220 after completion of the transfer operation (e.g., rather than during the transfer operation). Additionally, the data from the suspect blocks 220 may be written directly to the spare blocks, which may reduce intermediate copying of data, thereby reducing write amplification and increasing the operable lifetime of the memory system 211.

After the media management operation is complete, the memory system 211 may retire the suspect blocks 220-*b*, 220-*c*, and 220-*d*. That is, the memory system 211 may block the suspect blocks 220 from being accessed (e.g., written to or read from). In some examples, the memory system 211 may update relink information associated with the suspect blocks 220-*b*, 220-*c*, and 220-*d* in a table (e.g., a bad block manager (BBM) table). In some examples, the BBM table may indicate one or more blocks (e.g., suspect blocks 220-*b*, 220-*c*, and 220-*d*) associated with a program failure. In some cases, the BBM table may indicate that the suspect blocks 220-*b*, 220-*c*, and 220-*d* are retired blocks.

In some cases, the memory system 211 may receive another command (e.g., a read command) to access a portion of the data transferred to the destination blocks 220 of the virtual block 215. If the memory system 211 receives the read command after the transfer operation, the refresh operation, or both are complete, the memory system 211 may read the portion of the data from the spare blocks, the non-replaced destination blocks 220, or both. For example, if a portion of the requested data was transferred to a suspect block 220-*b*, 220-*c*, and/or 220-*d* during the transfer operation, the memory system 211 may instead read the data from the associated (e.g., linked) spare block. Additionally, or alternatively, if a portion of the requested data was transferred to a destination block without any associated program failures (e.g., not a suspect block, such as destination block 220-*a*), the memory system may read the data from the respective destination block.

Figure 3:
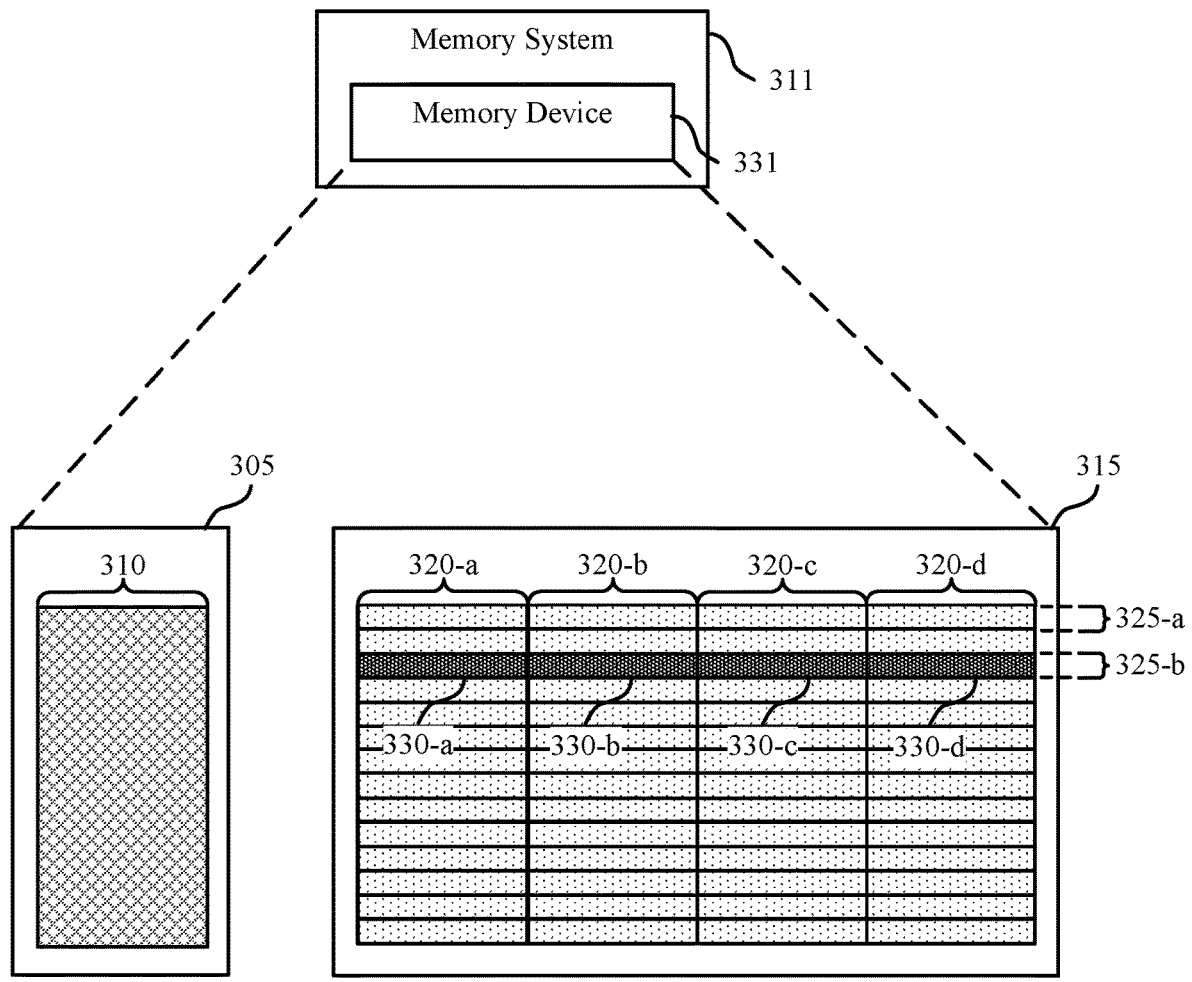
FIG. 3 illustrates an example of a system that supports programming failure handling during data folding in accordance with examples as disclosed herein.

FIG. 3 illustrates an example of a system 300 that supports programming failure handling during data folding in accordance with examples as disclosed herein. The system 300 may be an example of a system 100 as described with reference to FIG. 1, a system 200 as described with reference to FIG. 2, or aspects thereof. The system 300 may include a memory system 311 configured to transfer data from at least one source block 310 of a virtual block 305 to at least one destination block 320 of a virtual block 315. The system 300 may implement aspects of the system 100 as described with reference to FIG. 1. For example, virtual blocks 305 and 315 may be examples of a virtual block 180, and blocks 320-*a*, 320-*b*, 320-*c*, and 320-*d* may be examples of blocks 170-*a*, 170-*b*, 170-*c*, and 170-*d*, respectively. Additionally, the pages 330 may be examples of pages 175.

The system 300 may include a memory system 311, which may include at least one memory device 331 to store data transferred between the memory system 311 and a host system. For example, the memory device 331 may include a virtual block 305 for one or more physical blocks 310, each with one or more pages. Additionally, the memory device 331 may include a virtual block 315 for one or more blocks 320 (e.g., blocks 320-*a*, 320-*b*, 320-*c*, and 320-*d*), and each of the blocks 320 may have one or more pages 330. The virtual blocks 305 and 315 may be examples of the virtual blocks 205 and 215 described with reference to FIG. 2. Within the virtual block 315, the same page across each block 320 may share (e.g., be coupled with) a common word line 325. For example, the first page of each block 320 may be coupled with a common word line 325-*a* (e.g., WL0), and so on, and pages 330 coupled with a common word line 325 may be referred to as a pageline, as described with reference to FIG. 2.

The memory system 311 may transfer data stored at a set of one or more source blocks 310 (e.g., the virtual block 305) to a set of one or more destination blocks 320 (e.g., the virtual block 315). In the example of FIG. 3, during the transfer of data, the memory system 311 may identify a program failure associated with a word line 325 (e.g., a pageline of pages 330), such as the word line 325-*b*. For example, the memory system 311 may determine that the word line 325-*b* (e.g., each of the pages 330-*a*, 330-*b*, 330-*c*, and 330-*d*) has failed during the transfer of the data to the respective destination blocks 320. The memory system 311 may mark the failed word line 325-*b* of the failed destination blocks 320 as including uncorrectable data (e.g., uncorrectable error correction code (UECC)). In some examples, although the failed word line 325-*b* may not include UECC, the memory system 311 may mark the failed word line 325-*b* as including UECC rather than marking the data for garbage collection, which may enable the memory system 311 to continue transferring the data to other pages 330 of the virtual block 315 (e.g., including re-attempting to program the data associated with the program failure).

The memory system 311 may include one or more spare virtual blocks that may be used to replace failed virtual blocks. In the example of FIG. 3, the memory system 311 may replace the virtual block 315 with a spare virtual block after the transfer of the data is complete. For example, the memory system 311 may mark the virtual block 315 (e.g., and each of the destination blocks 320) as suspect blocks based on the program failure, as described with reference to FIG. 2. After the transfer of the data to the virtual block 315 (e.g., after performing a verification operation, updating associated L2P mapping information, and releasing the source blocks, as described with reference to FIG. 2), the memory system 311 may replace the virtual block 315 with a spare virtual block (e.g., as part of a refresh operation). For example, the memory system 311 may transfer (e.g., copy) the data stored at the virtual block 315 to the virtual spare block (e.g., date stored at the destination blocks 320 to blocks of the virtual spare block), including the data marked as uncorrectable (e.g., which may be dummy data).

After the virtual block replacement is complete, the memory system 311 may retire the virtual block 315. In some examples, the memory system 311 may update a BBM table to indicate the virtual block 315 as retired.

FIG. 4 illustrates an example of a process flow 400 that supports programming failure handling during data folding in accordance with examples as disclosed herein. In some examples, the process flow 400 may be implemented by one or more aspects of the systems (e.g., the memory systems) as described with reference to FIGS. 1 through 3. For instance, the process flow 400 may be implemented by a memory system, such as the memory systems described with reference to FIGS. 1 through 3. The memory system may be configured to perform a non-blocking process as part of folding to reduce latency during folding operations, reduce write amplification, and improve the overall performance of the memory system, among other benefits.

Aspects of the process flow 400 may be implemented by a controller, among other components. Additionally or alternatively, aspects of the process flow 400 may be implemented as instructions stored in memory (e.g., firmware stored in a memory coupled with a memory system). For example, the instructions, when executed by a controller (e.g., the memory system controller 115), may cause the controller to perform the operations of the process flow 400.

At 405, a transfer operation to transfer data within the memory system may be initiated. For example, the memory system may initiate a transfer operation (e.g., a folding operation). For example, the memory system may initiate an operation to transfer data stored at a first set of one or more physical blocks (e.g., source blocks, a source virtual block) of the memory system to a second set of one or more physical blocks (e.g., destination blocks, a destination virtual block) of the memory system. In some examples, the source blocks may be SLC, MLC, TLC, or QLC blocks, and the destination blocks may be MLC, TLC, or QLC blocks.

At 410, during the transfer operation, a program failure associated with one or more respective physical blocks may be identified. For example, the memory system may identify the program failure at the one or more respective physical blocks. For example, the program failure may be caused by or associated with transferring a portion of the data from one or more pages of the one or more source blocks to one or more pages of the one or more destination blocks. Thus, based on being associated with the program failure, the memory system may identify the one or more destination blocks as failed destination blocks, identify the one or more pages as failed pages, or both.

At 415, the failed page may be marked as including (e.g., storing) uncorrectable data. For example, the memory system may mark the failed page of the failed destination block as including uncorrectable data (e.g., mark the page as UECC) based on (e.g., in response to) identifying the program failure.

At 420, the one or more failed destination blocks may be marked as suspect. For example, the memory system may mark the one or more failed destination blocks as suspect blocks based on identifying the program failure. For example, the memory system may store an indication that the one or more failed destination blocks are associated with the program failure. In some cases, the memory system may mark the virtual block of the one or more failed destination blocks as a suspect virtual block. For example, the memory system may store an indication that the virtual block is associated with the program failure based on the virtual block including the one or more pages marked as UECC. In some examples, if the virtual block is marked as a suspect virtual block, the memory system may add an identifier of the virtual block to a list (e.g., a read scrub list) of suspect virtual blocks.

At 425, the transfer operation may continue. For example, the memory system may proceed with the transfer operation to transfer the data to the destination blocks. In some cases, if a program failure has occurred, the memory system may transfer the same portion of data again. For example, after the portion of data fails to be transferred to a first page (e.g., a failed page), and the page is marked for UECC, the memory system may attempt to transfer the same data to another page (e.g., an adjacent page, or another subsequent page of the virtual block). If another program failure does not occur, the data may be successfully transferred to the other page (e.g., of another or same destination block of the virtual block).

In some cases, at 430, a command to access a portion of the data may be received. For example, the memory system may receive the command (e.g., a read command) to access the portion of the data transferred to the destination blocks of the virtual block. If the memory system receives the read command before the transfer operation is complete (e.g., and before the suspect blocks are refreshed), the memory system may read the portion of the data from the source blocks rather than the destination blocks (e.g., and any included suspect blocks), for example, based on L2P mapping information not yet being updated to reflect the transfer of the data to the destination blocks.

At 435, a verification operation may be initiated. For example, as part of the transfer operation, the memory system may initiate a verification operation (e.g., a read verify) to verify the transfer of the data to the virtual block. For example, the memory system may verify each of the suspect blocks of the virtual block, for example, by reading each unmarked page of the suspect blocks for uncorrectable data (e.g., UECCs). In some examples, the memory system may explicitly exclude (e.g., skip) any pages already marked as UECC.

At 440, an evaluation of whether the unmarked pages are verified may be performed. For example, as part of the verification operation, the memory system may determine whether the virtual block (e.g., one or more of the suspect blocks) include one or more additional pages with uncorrectable data.

At 445, if the memory system does not identify additional pages with UECC, mapping information may be updated and the source blocks may be released. For example, the memory system may update mapping information (e.g., an L2P table), mapping logical addresses associated with the transferred data to the physical addresses associated with the destination blocks of the virtual block (e.g., physical addresses of the pages of the destination blocks). After the mapping information is updated, the memory system may release and erase the source blocks to a free pool of blocks.

At 450, after the transfer operation is complete, the suspect blocks may be replaced. For example, the memory system may initiate a refresh operation to replace each of the suspect blocks of the virtual block (e.g., replace the virtual block, for example, if the program failure is associated with a pageline of the virtual block) with a respective spare block (e.g., a spare virtual block). In some cases, the refresh operation may be initiated according to the scrub list, and each virtual block indicated therein (e.g., according to an order of the read scrub list). To perform the refresh operation for each suspect block, the memory system may transfer (e.g., copy) all of the data stored at the suspect block to a respective spare block. After the data is transferred to the spare block, the memory system may link each of the spare blocks (e.g., with the transferred data) to the virtual block.

At 455, after the refresh operation is complete, the suspect blocks may be retired. For example, the memory system may retire the suspect blocks. Further, the memory system may update the relink information associated with the suspect blocks in a table (e.g., BBM table). In some examples, the BBM may indicate one or more blocks (e.g., suspect blocks) associated with a program failure. In some cases, the BBM may indicate that the suspect blocks are retired blocks.

At 460, if the memory system identifies one or more additional pages with UECC during the verification operation, a new transfer operation may be initiated. For example, the memory system may initiate a new transfer operation (e.g., folding operation) to transfer the data stored at the source blocks to destination blocks of another virtual block, different than the first virtual block. In this case, the data may be maintained at the source blocks until the new transfer operation, and any refresh operations, verification operations, and the like, are complete. For example, the memory system may apply one or more of the processes described with reference to steps 410 through 460 or steps 410 through 455, to the new virtual block, and the respective new destination blocks.

Figure 5:
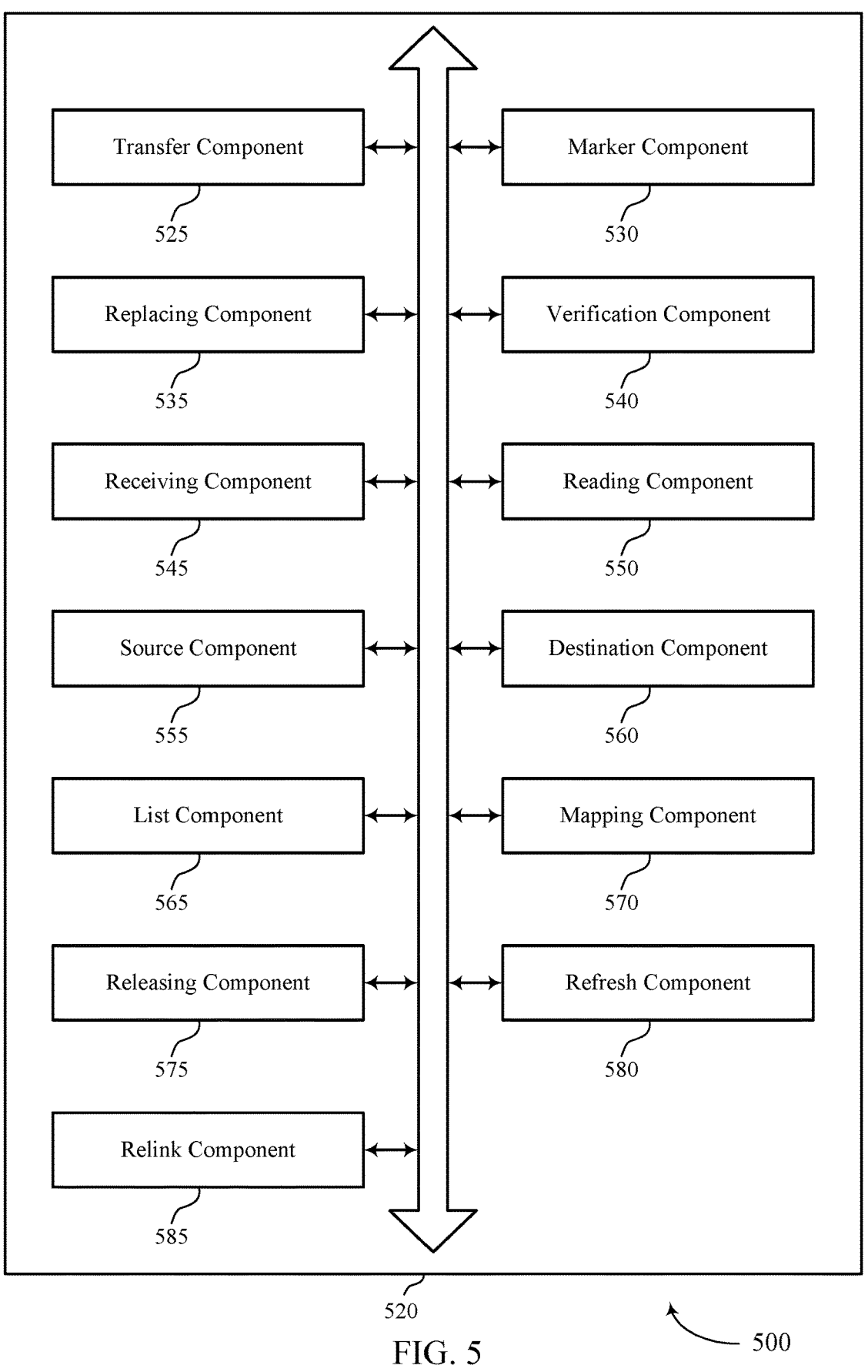
FIG. 5 illustrates a block diagram of a memory system that supports programming failure handling during data folding in accordance with examples as disclosed herein.

FIG. 5 illustrates a block diagram 500 of a memory system 520 that supports programming failure handling during data folding in accordance with examples as disclosed herein. The memory system 520 may be an example of aspects of a memory system as described with reference to FIGS. 1 through 4. The memory system 520, or various components thereof, may be an example of means for performing various aspects of programming failure handling during data folding as described herein. For example, the memory system 520 may include a transfer component 525, a marker component 530, a replacing component 535, a verification component 540, a receiving component 545, a reading component 550, a source component 555, a destination component 560, a list component 565, a mapping component 570, a releasing component 575, a refresh component 580, a relink component 585, or any combination thereof. Each of these components may communicate, directly or indirectly, with one another (e.g., via one or more buses).

The transfer component 525 may be configured as or otherwise support a means for initiating a transfer operation to transfer data stored at a first set of one or more blocks of a memory system to a second set of one or more blocks of the memory system. The marker component 530 may be configured as or otherwise support a means for marking one or more pages of a subset of one or more blocks of the second set of one or more blocks as including uncorrectable data based at least in part on a program failure during the transfer operation that is associated with transferring a subset of the data to the one or more pages. In some examples, the transfer component 525 may be configured as or otherwise support a means for transferring, as part of the transfer operation, the subset of data to one or more additional pages of the second set of one or more blocks based at least in part on marking the one or more pages.

In some examples, the replacing component 535 may be configured as or otherwise support a means for replacing, after the transfer operation, the subset of one or more blocks with a third set of one or more blocks based at least in part on marking the one or more pages as including uncorrectable data.

In some examples, the marker component 530 may be configured as or otherwise support a means for storing a second indication that the subset of one or more blocks is associated with the program failure, where the subset of one or more blocks are replaced based at least in part on the second indication.

In some examples, the marker component 530 may be configured as or otherwise support a means for storing a first indication that a virtual block including the second set of one or more blocks is associated with the program failure based at least in part on marking the one or more pages as including uncorrectable data.

In some examples, the list component 565 may be configured as or otherwise support a means for adding an identifier associated with the virtual block to a list of one or more virtual blocks based at least in part on storing the first indication, where the list of one or more virtual blocks is associated with replacing one or more blocks marked as including uncorrectable data.

In some examples, the refresh component 580 may be configured as or otherwise support a means for initiating, based at least in part on adding the virtual block to the list of one or more virtual blocks, a first media management operation to replace the subset of one or more blocks with a third set of one or more blocks within the virtual block. In some examples, the refresh component 580 may be configured as or otherwise support a means for transferring, as part of the first media management operation, data stored at the subset of one or more blocks to a third set of one or more blocks. In some examples, the refresh component 580 may be configured as or otherwise support a means for linking, as part of the first media management operation, each block of the third set of one or more blocks to the virtual block based at least in part on replacing the subset of one or more blocks with the third set of one or more blocks.

In some examples, the relink component 585 may be configured as or otherwise support a means for updating, based at least in part on the first media management operation, relink information associated with the subset of one or more blocks to indicate that the subset of one or more blocks is associated with the program failure.

In some examples, the verification component 540 may be configured as or otherwise support a means for initiating, as part of the transfer operation, a verification operation to verify the transfer of the data to a virtual block including the second set of one or more blocks. In some examples, the verification component 540 may be configured as or otherwise support a means for determining, as part of the verification operation, whether a page of the second set of one or more blocks, excluding the one or more marked pages, includes uncorrectable data.

In some examples, the mapping component 570 may be configured as or otherwise support a means for updating, based at least in part on verifying the transfer of the data to the virtual block, mapping information to map logical addresses associated with the data to physical addresses associated with the second set of one or more blocks. In some examples, the releasing component 575 may be configured as or otherwise support a means for releasing the first set of one or more blocks based at least in part on updating the mapping information.

In some examples, the transfer component 525 may be configured as or otherwise support a means for initiating a third transfer operation to transfer the data stored at the first set of one or more blocks to a second virtual block including a third set of one or more blocks of the memory system based at least in part on determining that the page includes uncorrectable data.

In some examples, the receiving component 545 may be configured as or otherwise support a means for receiving, prior to a completion of the transfer operation, a command to read a portion of the data transferred to a virtual block including the second set of one or more blocks. In some examples, the reading component 550 may be configured as or otherwise support a means for reading, based at least in part on receiving the command prior to the completion of the transfer operation, the portion of the data from the first set of one or more blocks.

In some examples, the first set of one or more blocks include SLCs, MLCs, TLCs, or QLCs. In some examples, the second set of one or more blocks include MLCs, TLCs, or QLCs.

In some examples, the transfer operation is a folding operation.

FIG. 6 illustrates a flowchart showing a method 600 that supports programming failure handling during data folding in accordance with examples as disclosed herein. The operations of method 600 may be implemented by a memory system or its components as described herein. For example, the operations of method 600 may be performed by a memory system as described with reference to FIGS. 1 through 5. In some examples, a memory system may execute a set of instructions to control the functional elements of the device to perform the described functions. Additionally, or alternatively, the memory system may perform aspects of the described functions using special-purpose hardware.

At 605, the method may include initiating a transfer operation to transfer data stored at a first set of one or more blocks of a memory system to a second set of one or more blocks of the memory system. The operations of 605 may be performed in accordance with examples as disclosed herein. In some examples, aspects of the operations of 605 may be performed by a transfer component 525 as described with reference to FIG. 5.

At 610, the method may include marking one or more pages of a subset of one or more blocks of the second set of one or more blocks as including uncorrectable data based at least in part on a program failure during the transfer operation that is associated with transferring a subset of the data to the one or more pages. The operations of 610 may be performed in accordance with examples as disclosed herein. In some examples, aspects of the operations of 610 may be performed by a marker component 530 as described with reference to FIG. 5.

At 615, the method may include transferring, as part of the transfer operation, the subset of data to one or more additional pages of the second set of one or more blocks based at least in part on marking the one or more pages. The operations of 615 may be performed in accordance with examples as disclosed herein. In some examples, aspects of the operations of 615 may be performed by a transfer component 525 as described with reference to FIG. 5.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for initiating a transfer operation to transfer data stored at a first set of one or more blocks of a memory system to a second set of one or more blocks of the memory system; marking one or more pages of a subset of one or more blocks of the second set of one or more blocks as including uncorrectable data based at least in part on a program failure during the transfer operation that is associated with transferring a subset of the data to the one or more pages; and transferring, as part of the transfer operation, the subset of data to one or more additional pages of the second set of one or more blocks based at least in part on marking the one or more pages.

Aspect 2: The method, apparatus, or non-transitory computer-readable medium of aspect 1, further including operations, features, circuitry, logic, means, or instructions, or any combination thereof for replacing, after the transfer operation, the subset of one or more blocks with a third set of one or more blocks based at least in part on marking the one or more pages as including uncorrectable data.

Aspect 3: The method, apparatus, or non-transitory computer-readable medium of aspect 2, further including operations, features, circuitry, logic, means, or instructions, or any combination thereof for storing a second indication that the subset of one or more blocks is associated with the program failure, where the subset of one or more blocks are replaced based at least in part on the second indication.

Aspect 4: The method, apparatus, or non-transitory computer-readable medium of any of aspects 1 through 3, further including operations, features, circuitry, logic, means, or instructions, or any combination thereof for storing a first indication that a virtual block including the second set of one or more blocks is associated with the program failure based at least in part on marking the one or more pages as including uncorrectable data.

Aspect 5: The method, apparatus, or non-transitory computer-readable medium of aspect 4, further including operations, features, circuitry, logic, means, or instructions, or any combination thereof for adding an identifier associated with the virtual block to a list of one or more virtual blocks based at least in part on storing the first indication, where the list of one or more virtual blocks is associated with replacing one or more blocks marked as including uncorrectable data.

Aspect 6: The method, apparatus, or non-transitory computer-readable medium of aspect 5, further including operations, features, circuitry, logic, means, or instructions, or any combination thereof for initiating, based at least in part on adding the virtual block to the list of one or more virtual blocks, a first media management operation to replace the subset of one or more blocks with a third set of one or more blocks within the virtual block; transferring, as part of the first media management operation, data stored at the subset of one or more blocks to a third set of one or more blocks; and linking, as part of the first media management operation, each block of the third set of one or more blocks to the virtual block based at least in part on replacing the subset of one or more blocks with the third set of one or more blocks.

Aspect 7: The method, apparatus, or non-transitory computer-readable medium of aspect 6, further including operations, features, circuitry, logic, means, or instructions, or any combination thereof for updating, based at least in part on the first media management operation, relink information associated with the subset of one or more blocks to indicate that the subset of one or more blocks is associated with the program failure.

Aspect 8: The method, apparatus, or non-transitory computer-readable medium of any of aspects 1 through 7, further including operations, features, circuitry, logic, means, or instructions, or any combination thereof for initiating, as part of the transfer operation, a verification operation to verify the transfer of the data to a virtual block including the second set of one or more blocks and determining, as part of the verification operation, whether a page of the second set of one or more blocks, excluding the one or more marked pages, includes uncorrectable data.

Aspect 9: The method, apparatus, or non-transitory computer-readable medium of aspect 8, further including operations, features, circuitry, logic, means, or instructions, or any combination thereof for updating, based at least in part on verifying the transfer of the data to the virtual block, mapping information to map logical addresses associated with the data to physical addresses associated with the second set of one or more blocks and releasing the first set of one or more blocks based at least in part on updating the mapping information.

Aspect 10: The method, apparatus, or non-transitory computer-readable medium of any of aspects 8 through 9, further including operations, features, circuitry, logic, means, or instructions, or any combination thereof for initiating a third transfer operation to transfer the data stored at the first set of one or more blocks to a second virtual block including a third set of one or more blocks of the memory system based at least in part on determining that the page includes uncorrectable data.

Aspect 11: The method, apparatus, or non-transitory computer-readable medium of any of aspects 1 through 10, further including operations, features, circuitry, logic, means, or instructions, or any combination thereof for receiving, prior to a completion of the transfer operation, a command to read a portion of the data transferred to a virtual block including the second set of one or more blocks and reading, based at least in part on receiving the command prior to the completion of the transfer operation, the portion of the data from the first set of one or more blocks.

Aspect 12: The method, apparatus, or non-transitory computer-readable medium of any of aspects 1 through 11, where the first set of one or more blocks include SLCs, MLCs, TLCs, or QLCs and the second set of one or more blocks include MLCs, TLCs, or QLCs.

Aspect 13: The method, apparatus, or non-transitory computer-readable medium of any of aspects 1 through 11, where the transfer operation is a folding operation.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally, or alternatively (e.g., in an alternative example), be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
a memory device; and
a controller coupled with the memory device and configured to cause the apparatus to:
initiate a transfer operation to transfer data stored at a first set of one or more blocks of the apparatus to a second set of one or more blocks of the apparatus;
mark one or more pages of a subset of one or more blocks of the second set of one or more blocks as comprising uncorrectable data based at least in part on a program failure during the transfer operation that is associated with transferring a subset of the data to the one or more pages, wherein, to mark the one or more pages, the controller is configured to cause the apparatus to store an indication that the one or more pages comprise uncorrectable data associated with the program failure; and
transfer, as part of the transfer operation, the subset of the data to one or more additional pages of the second set of one or more blocks based at least in part on marking the one or more pages.

2. The apparatus of claim 1, wherein the controller is further configured to cause the apparatus to:
replace, after the transfer operation, the subset of one or more blocks with a third set of one or more blocks based at least in part on marking the one or more pages as comprising uncorrectable data.

3. The apparatus of claim 2, wherein the controller is further configured to cause the apparatus to:
store a second indication that the subset of one or more blocks is associated with the program failure, wherein the subset of one or more blocks are replaced based at least in part on the second indication.

4. The apparatus of claim 1, wherein the controller is further configured to cause the apparatus to:
store a first indication that a virtual block comprising the second set of one or more blocks is associated with the program failure based at least in part on marking the one or more pages as comprising uncorrectable data.

5. The apparatus of claim 4, wherein the controller is further configured to cause the apparatus to:

add an identifier associated with the virtual block to a list of one or more virtual blocks based at least in part on storing the first indication, wherein the list of one or more virtual blocks is associated with replacing one or more blocks marked as comprising uncorrectable data.

6. The apparatus of claim 5, wherein the controller is further configured to cause the apparatus to:
initiate, based at least in part on adding the virtual block to the list of one or more virtual blocks, a first media management operation to replace the subset of one or more blocks with a third set of one or more blocks within the virtual block;
transfer, as part of the first media management operation, data stored at the subset of one or more blocks to a third set of one or more blocks; and
link, as part of the first media management operation, each block of the third set of one or more blocks to the virtual block based at least in part on replacing the subset of one or more blocks with the third set of one or more blocks.

7. The apparatus of claim 6, wherein the controller is further configured to cause the apparatus to:
updating, based at least in part on the first media management operation, relink information associated with the subset of one or more blocks to indicate that the subset of one or more blocks is associated with the program failure.

8. The apparatus of claim 1, wherein the controller is further configured to cause the apparatus to:
initiate, as part of the transfer operation, a verification operation to verify the transfer of the data to a virtual block comprising the second set of one or more blocks; and
determine, as part of the verification operation, whether a page of the second set of one or more blocks, excluding the one or more marked pages, comprises uncorrectable data.

9. The apparatus of claim 8, wherein the controller is further configured to cause the apparatus to:
update, based at least in part on verifying the transfer of the data to the virtual block, mapping information to map logical addresses associated with the data to physical addresses associated with the second set of one or more blocks; and
release the first set of one or more blocks based at least in part on updating the mapping information.

10. The apparatus of claim 8, wherein the controller is further configured to cause the apparatus to:
initiate a third transfer operation to transfer the data stored at the first set of one or more blocks to a second virtual block comprising a third set of one or more blocks of the apparatus based at least in part on determining that the page comprises uncorrectable data.

11. The apparatus of claim 1, wherein the controller is further configured to cause the apparatus to:
receive, prior to a completion of the transfer operation, a command to read a portion of the data transferred to a virtual block comprising the second set of one or more blocks; and
read, based at least in part on receiving the command prior to the completion of the transfer operation, the portion of the data from the first set of one or more blocks.

12. The apparatus of claim 1, wherein:
the first set of one or more blocks comprise single-level cells, and
the second set of one or more blocks comprise multi-level cells, tri-level cells, or quad-level cells.

13. The apparatus of claim 1, wherein the transfer operation is a folding operation.

14. A non-transitory computer-readable medium storing code comprising instructions which, when executed by a processor of an electronic device, cause the electronic device to:

initiate a transfer operation to transfer data stored at a first set of one or more blocks of a memory system to a second set of one or more blocks of the memory system;

mark one or more pages of a subset of one or more blocks of the second set of one or more blocks as comprising uncorrectable data based at least in part on a program failure during the transfer operation that is associated with transferring a subset of the data to the one or more pages, wherein the instructions to mark the one or more pages, when executed by the processor of the electronic device, cause the electronic device to store an indication that the one or more pages comprise uncorrectable data associated with the program failure; and transfer, as part of the transfer operation, the subset of the data to one or more additional pages of the second set of one or more blocks based at least in part on marking the one or more pages.

15. The non-transitory computer-readable medium of claim 14, wherein the instructions, when executed by the processor of the electronic device, further cause the electronic device to:

replace, after the transfer operation, the subset of one or more blocks with a third set of one or more blocks based at least in part on marking the one or more pages as comprising uncorrectable data.

16. The non-transitory computer-readable medium of claim 15, wherein the instructions, when executed by the processor of the electronic device, further cause the electronic device to:

store a second indication that the subset of one or more blocks is associated with the program failure, wherein the subset of one or more blocks are replaced based at least in part on the second indication.

17. The non-transitory computer-readable medium of claim 14, wherein the instructions, when executed by the processor of the electronic device, further cause the electronic device to:

store a first indication that a virtual block comprising the second set of one or more blocks is associated with the program failure based at least in part on marking the one or more pages as comprising uncorrectable data.

18. The non-transitory computer-readable medium of claim 14, wherein the instructions, when executed by the processor of the electronic device, further cause the electronic device to:

initiate, as part of the transfer operation, a verification operation to verify the transfer of the data to a virtual block comprising the second set of one or more blocks; and determine, as part of the verification operation, whether a page of the second set of one or more blocks, excluding the one or more marked pages, comprises uncorrectable data.

19. A method, comprising:

initiating a transfer operation to transfer data stored at a first set of one or more blocks of a memory system to a second set of one or more blocks of the memory system;

marking one or more pages of a subset of one or more blocks of the second set of one or more blocks as comprising uncorrectable data based at least in part on a program failure during the transfer operation that is associated with transferring a subset of the data to the one or more pages, wherein marking the one or more pages comprises storing an indication that the one or more pages comprise uncorrectable data associated with the program failure; and transferring, as part of the transfer operation, the subset of the data to one or more additional pages of the second set of one or more blocks based at least in part on marking the one or more pages.

20. The method of claim 19, further comprising:

replacing, after the transfer operation, the subset of one or more blocks with a third set of one or more blocks based at least in part on marking the one or more pages as comprising uncorrectable data.

* * * * *